US006981862B2

(12) United States Patent
Bond et al.

(10) Patent No.: US 6,981,862 B2
(45) Date of Patent: Jan. 3, 2006

(54) SLUSH MOLDING MACHINE

(75) Inventors: Janine R. Bond, Ann Arbor, MI (US);
Juhan Kim, Oakland Township, MI (US)

(73) Assignee: Toyota Technical Center USA, Inc., Ann Arbor, MI (US)

(*) Notice: Subject to any disclaimer, the term of this patent is extended or adjusted under 35 U.S.C. 154(b) by 134 days.

(21) Appl. No.: 10/658,966

(22) Filed: Sep. 9, 2003

(65) Prior Publication Data
US 2005/0053690 A1 Mar. 10, 2005

(51) Int. Cl.
B29C 41/36 (2006.01)
B29C 41/46 (2006.01)

(52) U.S. Cl. ............... 425/151; 425/404; 425/435; 425/446; 264/302

(58) Field of Classification Search ............... 425/151, 425/404, 435, 446; 264/237, 302, 348
See application file for complete search history.

(56) References Cited

U.S. PATENT DOCUMENTS 3,506,755 A * 4/1970 Rudder et al. .............. 264/302
3,621,535 A * 11/1971 Ringdal ..................... 264/302
4,389,177 A 6/1983 Colby ........................ 425/144
4,623,503 A 11/1986 Anestis et al. .............. 264/302
4,690,626 A 9/1987 Krzepinski ................... 425/88
4,695,244 A 9/1987 Friesen ...................... 425/429
4,722,678 A * 2/1988 Wersosky ................... 425/435
4,740,337 A * 4/1988 Gale et al. .................. 264/302
4,755,333 A * 7/1988 Gray .......................... 425/435
4,767,299 A 8/1988 Friesen ...................... 425/135
4,767,505 A * 8/1988 Satoh et al. ................. 264/311
4,790,510 A 12/1988 Takamatsu et al. ......... 249/117
4,874,565 A 10/1989 Preston .................... 264/37.18
4,898,697 A 2/1990 Horton ......................... 264/37
4,946,638 A 8/1990 Takamatsu .................. 264/302
4,979,888 A * 12/1990 Bauer et al. ................ 425/435
5,039,297 A 8/1991 Masters ...................... 425/429
5,106,285 A 4/1992 Preston ...................... 425/144
5,221,539 A * 6/1993 Pallerberg et al. .......... 425/435
6,036,897 A 3/2000 Nugent ..................... 264/40.6
6,284,182 B1 9/2001 McNally .................... 264/306
6,410,141 B1 6/2002 Grimmer ................... 428/402
6,461,561 B1 10/2002 McNally .................... 264/302
6,589,470 B2 * 7/2003 Fried et al. ................. 425/435

* cited by examiner

Primary Examiner—James P. Mackey
(74) Attorney, Agent, or Firm—Gifford, Krass, Groh, Sprinkle, Anderson Citkowski P.C.

(57) ABSTRACT

A slush molding machine having a tool with an outer surface includes a powder assembly. The powder assembly has a powder reservoir and a first lift. The first lift includes a first frame and a cylinder. The powder reservoir is mounted on the first frame. One end of the cylinder is attached to the frame, allowing the frame to be raised and lowered. The slush molding machine also includes a cooling assembly. The cooling assembly has a coolant reservoir and a second lift. The second lift has a second frame and a second cylinder. The coolant reservoir is attached to the second frame. The second cylinder is also attached to the frame. When the second cylinder is actuated, the second frame is raised and lowered as needed.

22 Claims, 3 Drawing Sheets

SLUSH MOLDING MACHINE

BACKGROUND OF THE INVENTION

1. Field of the Invention

The present invention relates to a slush molding machine and, more particularly, to a slush molding machine suitable for use in research and development.

2. Description of the Prior Art

Slush molding machines have been used in assembly plants to mass produce molded vehicle components. Typically such high volume, high capacity slush molding machines must process a series of molds, also known as tools, on a continuous basis. For example, U.S. Pat. No. 4,690,626 discloses a molding device capable of producing parts from multiple tools. This apparatus includes a heating chamber and several cooling chambers. The heating chamber is centrally located and the cooling chambers are arranged circularly about the heating chamber. The tools are mounted on supports that run between the heating chamber and the various cooling chambers. Thus, the tools can be shuttled between the heating chamber and the cooling chambers as needed.

While such high volume, high capacity slush molding machines are well suited to a production environment, it is impractical to use these devices to develop or evaluate different types of molding powders for several reasons. Firstly, the physical structure of high volume, high capacity slush molding machines is prohibitively large and cannot be stationed in a smaller environment, such as a laboratory. Scientists or engineers who want to develop or evaluate a molding powder must go to a slush molding machine located off site, which limits their ability to frequently evaluate molding powders. In addition, these off site slush molding machines might be involved in production, so any evaluation of molding powders would require halting production, thus increasing development lead time and production costs. Furthermore, high capacity, high volume slush molding machines require prohibitively large sample sizes of molding powder which makes testing or evaluating these molding powders at best inconvenient. Accordingly, it is desirable to have a slush molding machine that addresses one or more of the above-mentioned issues.

SUMMARY OF THE INVENTION

The invention relates to a slush molding machine suitable for use in a research and development environment. The space saving features of this machine permit its use in smaller environments, such as a research laboratory. In the preferred embodiment, the slush molding machine includes a powder assembly. The powder assembly includes a powder reservoir mounted on a frame. The frame is attached to the cylinder having the ability to raise and lower the frame to and from a tool as needed. The slush molding machine further includes a cooling assembly. The cooling assembly has a coolant reservoir containing a coolant such as water. The coolant reservoir is mounted on a second frame that is attached to a second cylinder. The second cylinder raises and lowers the coolant reservoir to and from the tool as needed. A powder assembly or a cooling assembly that has the ability to raise and lower to and from a tool allows for a conservative use of floor space.

BRIEF DESCRIPTION OF DRAWINGS

Reference is made to the attached drawings of the present invention wherein reference numerals and description refer to like parts throughout the several views and in which.

DETAILED DESCRIPTION OF THE PREFERRED EMBODIMENTS

Figure 1:
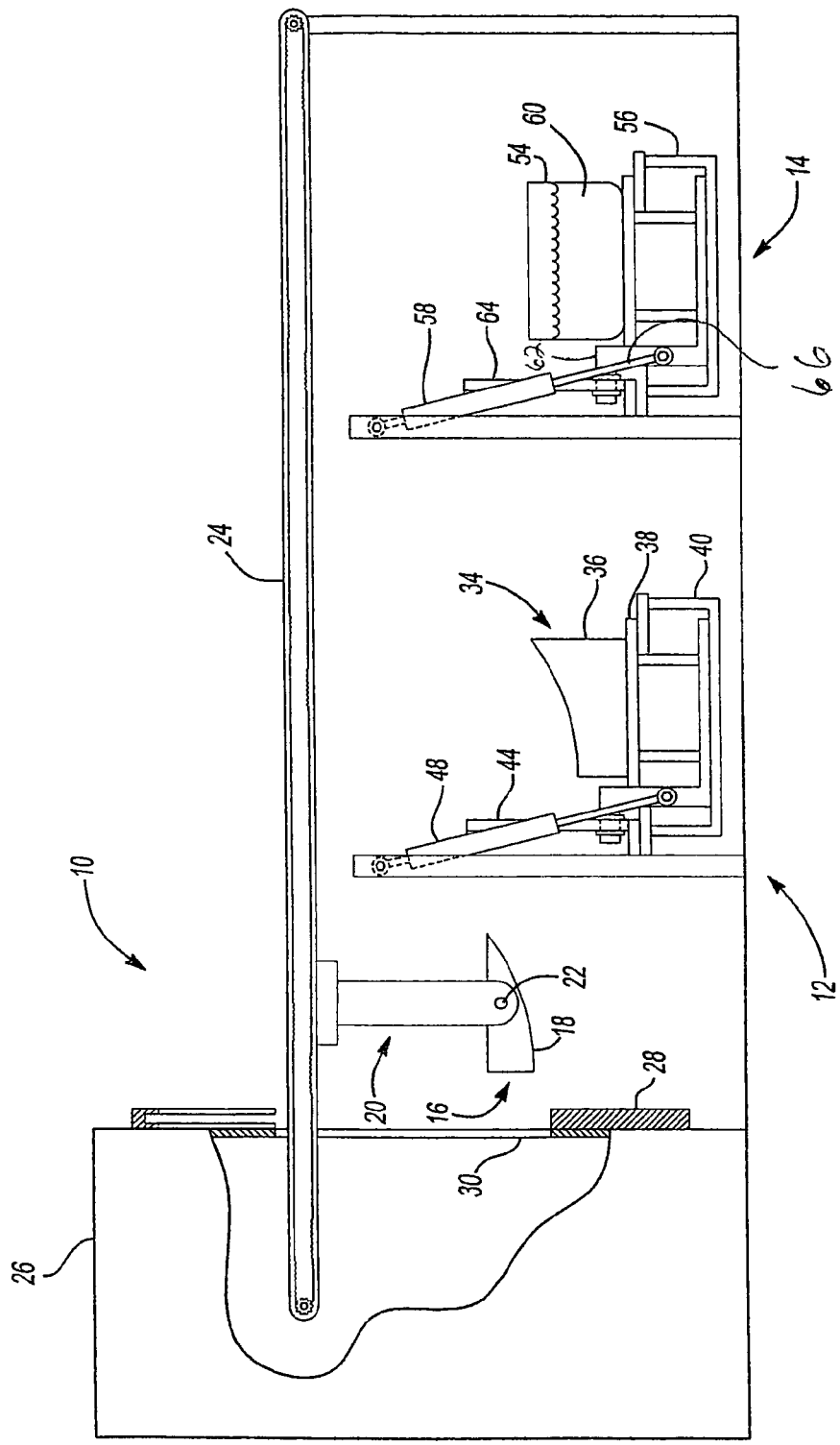
FIG. 1 is a side view of the oven, powder assembly, and cooling assembly of a slush molding machine in accordance with the present invention.

A slush molding machine 10 having a powder assembly 12 and a cooling assembly 14 is shown in FIG. 1. A tool 16, whose inner surface 18 is to be molded by slush molding machine 10, is mounted on a carriage assembly 20. Carriage assembly 20 has a rotating shaft 22 upon which tool 16 is mounted. Tool 16 can rotate 360° or a fraction thereof. Carriage assembly 20 further includes a motor (not shown) that moves carriage assembly 20 axially forward and backward along a track 24. Track 24 extends for the length of slush molding machine 10. Track 24 can be mounted on the ceiling of machine 10, the floor, or somewhere in between. The mounting location of the track 24 is not intended to be limiting.

Slush molding machine 10 further includes an oven 26 having a door 28, an opening 30, and heating elements (not shown). Opening 30 must be sufficiently large so that tool 16 can be inserted and withdrawn without difficulty. Door 28 is slidably mounted to oven 26 on a pair of rails (not shown) and is constructed to adequately seal oven 26 when in a closed position. Oven 26 further includes a fan (not shown) to aid in heat distribution within the interior of oven 26. An exemplary fan is Cincinnati Fan Model No. CPF-130; however, similar fans can be used. Oven 26 also includes an exhaust duct for ventilation of undesired gases. The interior of oven 26 must be sufficiently large for tool 16 to rotate 360° if necessary. Heating elements must be able to generate enough energy to sufficiently preheat tool 16 to the temperature required by the composition of the resin powder being molded. An example of such a component is the Midco International burner assembly No. F-400-33 with IRI compliance, but similar heating elements can be used and the type of heating element used is not intended to be limiting.

Figure 2:
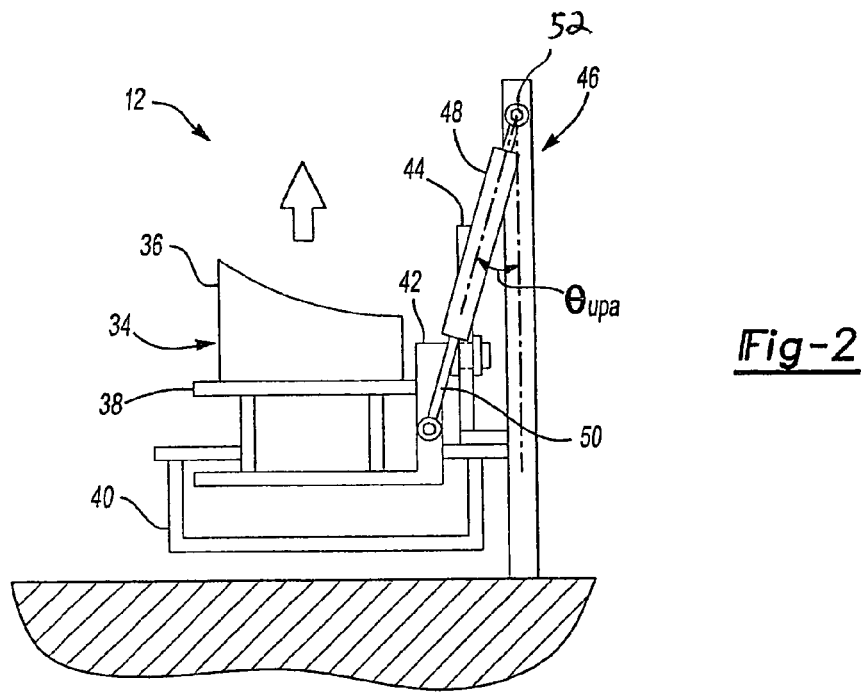
FIG. 2 is a side view of the powder assembly when it is fully raised from the floor of the slush molding machine.
Figure 3:
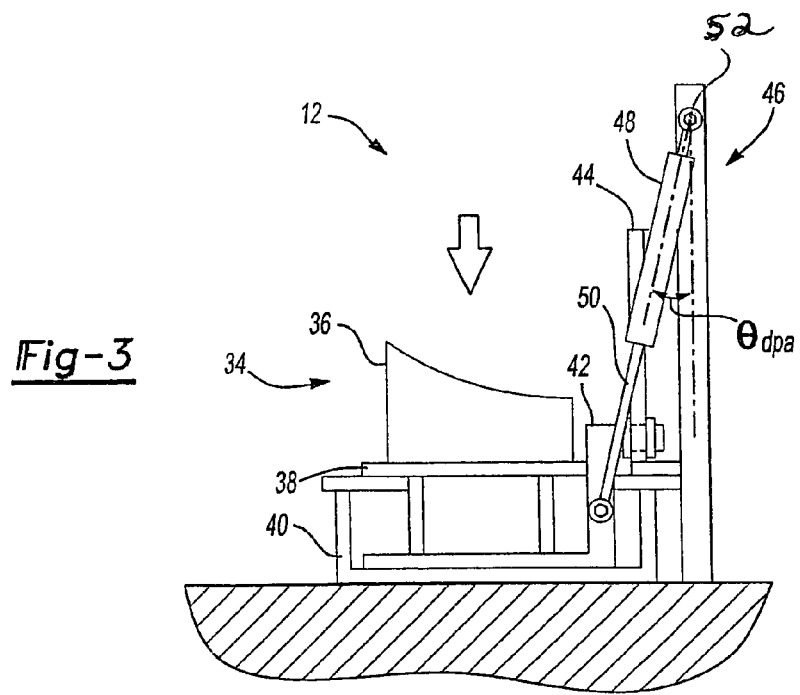
FIG. 3 is a side view of the powder assembly when it is fully lowered such that it is resting on the floor of the slush molding machine.

Slush molding machine 10 also includes powder assembly 12 having a powder box 34 including a skirt 36 and a platform 38 that is detachably mounted on a frame 40. Platform 38 includes at least one pneumatic C clamp (not shown) that is detachably coupled to tool 16. Frame 40 further includes an arm 42 (best shown in FIG. 2) configured to cooperate with a vertical guide 44. As best shown in FIGS. 2 and 3, powder assembly 12 further includes a lifting mechanism 46. Lifting mechanism 46 has a cylinder 48 having a rod 50 that is attached to frame 40. Cylinder 48 is pneumatic, but other types of cylinders, such as hydraulic, can be used. One end of cylinder 48 is affixed to a frame attachment point 52 of slush molding machine 10. Cylinder 48 is offset from frame attachment point 52 by $\theta_{upa}$ when powder assembly 12 is lifted to its maximum height off the floor. At this point, rod 50 of cylinder 48 is minimally extended. Conversely, cylinder 48 is offset $\theta_{dpa}$ from frame attachment point 52 when the powder assembly 12 is at rest on the floor, where $\theta_{upa}$ is greater than $\theta_{dpa}$. When powder assembly 12 is at rest on floor, rod 50 of cylinder 48 is at its maximum extension. In an alternative embodiment, in lieu of cylinder 48, a lifting mechanism 46 can be mounted under frame 40 in or under floor or on the ceiling of slush molding machine 10. Lifting mechanism 46 can be motorized, electric, hydraulic, pneumatic, or equivalents thereof. The specific mechanism used to perform the lifting and lowering is not intended to be limiting.

Referring back to FIG. 1, slush molding machine 10 further includes cooling assembly 14. Cooling assembly 14 has a tank 54, a heater (not shown), a frame 56, and a cylinder 58. Tank 54 is filled with a coolant 60, such as water, however other coolants can be used. The depth of coolant 60 in tank 54 must be sufficient to accommodate the immersion of tool 16 in tank 54. Heater is used to bring coolant 60 to and maintain coolant 60 at a desired temperature. Frame 56 includes an arm 62 configured to cooperate with a vertical guide 64 to assist in raising and lowering cooling assembly 14. Cooling assembly 14 further includes cylinder 58 having a rod 66, and operates in a manner similar to that which is disclosed and described above in powder assembly 12. In an alternative embodiment, tank 54 can be replaced by a mister, a sprayer, or other equivalent cooling devices.

Figure 4:
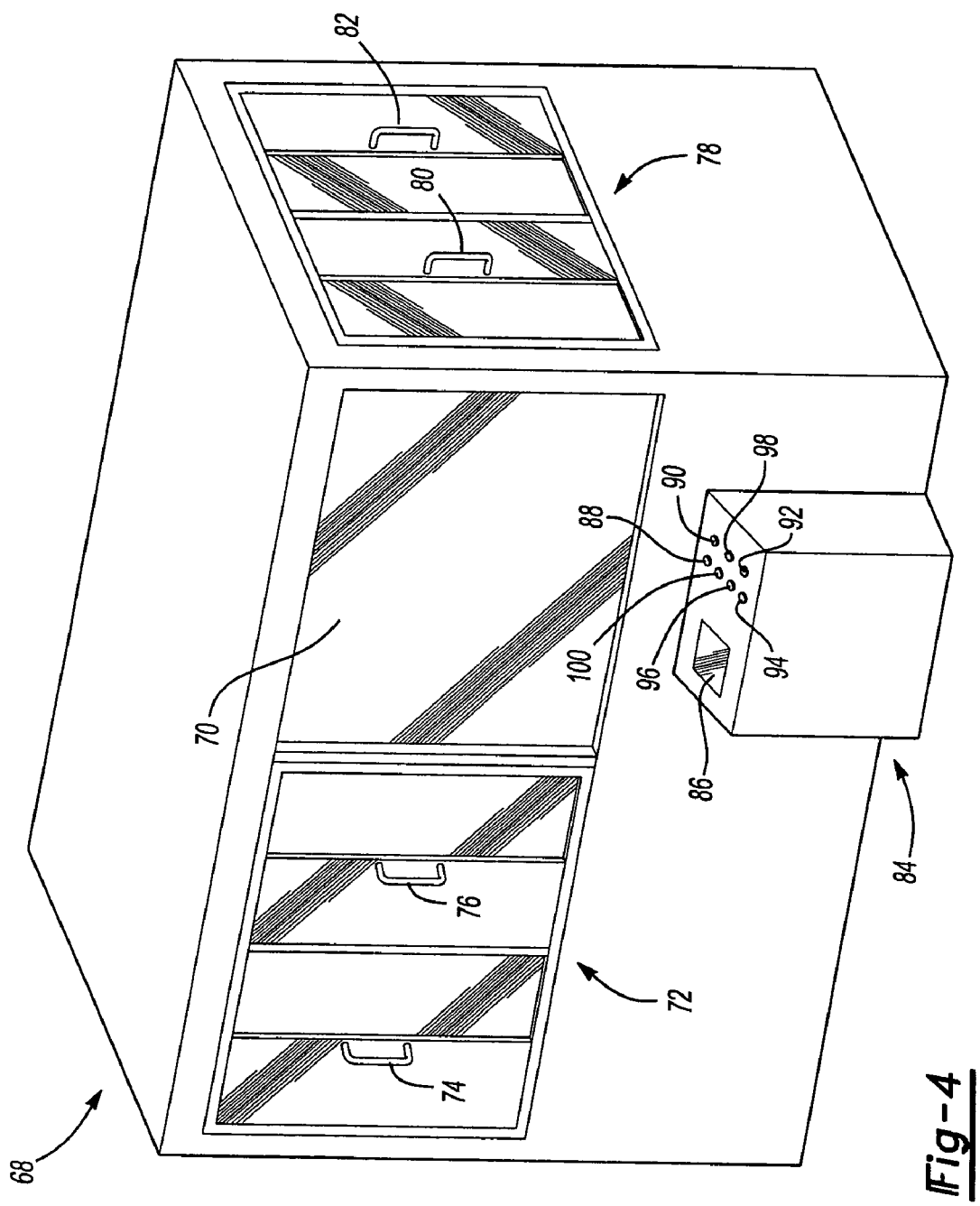
FIG. 4 is a perspective view of the guard assembly and the control panel in accordance with the present invention.

Referring now to FIG. 4, slush molding machine further includes a guard assembly 68. Guard assembly 68 extends about the perimeter of slush molding machine 10. Guard assembly 68 has a window 70, a first set of doors 72 having handles 74, 76, and a second set of doors 78 having handles 80, 82. First set 72 and second set of doors 78 are preferably clear to allow for easy viewing of machine 10. First set of doors 72 are primarily used for access to carriage assembly 14 to mount tool 16, but also can be used to access other parts of slush molding machine 10 as needed. Second set of doors 78 is primarily used to remove molded component from tool 16, but also can be used to access other parts of the slush molding machine 10 as described above. Guard assembly 68 is preferably constructed from steel panels or a comparable material suited to protect people and property from damage or injury due to the extreme heat and moving components within slush molding machine 10.

Finally, slush molding machine 10 includes a computerized control panel 84 for programmed or manual operation of slush molding machine. Control panel 84 includes software configured to interact with oven 26, carriage assembly 20, powder assembly 12, and cooling assembly 14. Panel 84 further includes a monitor 86, preferably a touch-screen monitor, to allow a user to select the type of operation desired. Panel 84 further includes a start button 88 to actuate machine 10, a cycle start button 90 to commence a user pre-programmed slush molding operation, a machine stop button 92 that powers down machine 10, and a cycle stop button 94 that stops the user pre-programmed slush molding operation. Panel 84 also includes a home button 96, that, when actuated, signals carriage assembly 20 to position tool 16 within oven 26. Jog arm button 98 allows a user to rotate tool 16 on carriage assembly 20 in a clockwise or counterclockwise manner. Panel 84 further includes an emergency stop button 100 that powers off machine 10 to stop all internal movement.

To mold an exemplary component, tool 16 is mounted on carriage assembly 20. Carriage assembly 20 then travels axially backward on track 24 to oven 26. Once carriage assembly 20 and tool 16 are fully inside oven 26, oven door 28 closes. Tool 16 will be heated to a predetermined temperature to enhance the ability of resin in powder box 34 to adhere to tool 16. Carriage assembly 20 rotates tool 360° to facilitate even heating of tool 16. Tool 16 remains in oven 26 until tool 16 is heated to its predetermined temperature.

Once tool 16 is sufficiently preheated, oven door 28 opens and carriage assembly 20 moves tool 16 axially forward out of oven 26. Tool 16 is then rotated until inner surface 18 is facing the floor. Carriage assembly 20 again moves axially forward on track 24 until tool 16 is positioned over powder assembly 12. Once tool 16 is positioned over powder assembly 12, rod 50 of cylinder 48 will retract, causing frame 40 of powder assembly 12 to rise until powder box skirt 36 contacts inner surface 18 of tool 16. Then pneumatic C clamps temporarily affix powder box 34 to tool 16. The frame 40 returns to a resting position. To spread the resin on powder box 34 evenly over inner surface 18 of tool 16, carriage assembly 20 rotates tool 16 counterclockwise 180° and then pauses approximately five seconds. Carriage assembly 20 then again rotates another 180° counterclockwise and pauses another five seconds. Finally, carriage assembly 20 rotates tool 16 another 180° counterclockwise. Once the rotations have finished, mallet (not shown) strikes tool 16 approximately five times to remove excess resin from inner surface 18 of tool 16. Rod 50 of cylinder 48 retracts, raising frame 40 to mechanically abut powder box 34. The pneumatic C clamps unclamp to release powder box 34 from tool 16. Then rod 50 of cylinder 48 extends, lowering powder assembly 12 back down to the floor. The description of the number and angle of rotations, the number and length of pauses, and the use of the mallet are programmable and can be changed to suit the needs of the material being molded.

Carriage assembly 20 again moves tool 16 axially forward on track 24 and positions tool 16 above cooling assembly 14 with inner surface 18 facing upwards. Rod 66 of cylinder 58 retracts, causing frame 56 of cooling assembly 14 to rise until tool 16 is immersed in coolant 60 to the desired depth. Once immersed, carriage assembly 20 rocks tool 16 back and forth at an approximately 45° angle within coolant 60 several times until the molded resin has sufficiently cooled. When carriage assembly 20 finishes rocking tool 16, rod 66 of cylinder 58 then extends to its maximum length, thereby lowering cooling assembly 14 back down to the floor. Finally, carriage assembly 20 travels axially forward to bring tool 16 to second set of doors 78. User can then open second set of doors 78 to retrieve the newly molded resin component.

The discussion and examples hereinabove represent a specific embodiment of applications of the present invention. Within the guidelines given herein, one of skill in the art could readily recognize variations of the invention. Therefore, it is to be understood that the foregoing discussion, description, and example are illustrative of a particular embodiment of the present invention but are not meant to be limitations upon the practice thereof. It is the following claims, including all equivalents, which define the scope of the invention.

What is claimed is:

1. A slush molding machine for fabricating a molded component using a tool having an inner surface, said machine comprising:
    a powder assembly having a first frame, a powder box mounted to said first frame, and a first lifting mechanism, wherein said first lifting mechanism includes a first cylinder having a first rod that is affixed to said first frame; and
    a cooling assembly.

2. The machine as set forth in claim 1 further including a heating means for preheating the tool.

3. The machine as set forth in claim 1 further including a carriage assembly for rotatably supporting the tool.

4. The machine as set forth in claim 3 further including a stationary track and said carriage assembly moves along said stationary track.

5. The machine as set forth in claim 1 further including a guard assembly extending about the perimeter of said machine, wherein said guard assembly includes at least one wall having an opening.

6. The machine as set forth in claim 1 further including a computerized control means for controlling operation of the machine.

7. The machine as set forth in claim 1 wherein said powder box further includes a skirt and a platform that is detachably mounted to the first frame.

8. A slush molding machine for fabricating a molded component using a tool having an inner surface comprising:
   a powder assembly having a powder box; and
   a cooling assembly having a second frame, a tank mounted to said second frame, and a second lifting mechanism, wherein said second lifting mechanism includes a second cylinder having a second rod that is affixed to said second frame.

9. The machine as set forth in claim 8 whereby said powder assembly further includes a first frame, said powder box mounted to said first frame, and a first lifting mechanism, wherein said first lifting mechanism includes a first cylinder having a first rod that is affixed to said first frame.

10. The machine as set forth in claim 8 further including a heating means for preheating the tool.

11. The machine as set forth in claim 8 further including a carriage assembly for rotatably supporting the tool.

12. The machine as set forth in claim 11 further including a stationary track and said carriage assembly moves along said stationary track.

13. The machine as set forth in claim 8 further including a guard assembly extending about the perimeter of said machine, wherein said guard assembly includes at least one wall having an opening.

14. The machine as set forth in claim 8 further including a computerized control means for controlling operation of the machine.

15. The machine as set forth in claim 9 wherein said powder box further includes a skirt and a platform that is detachably mounted to said first frame.

16. A slush molding machine for fabricating molded components using a tool having an inner surface, said machine comprising:
    a powder assembly having a first frame, a powder box mounted to said first frame, and a first lifting mechanism for lifting said powder box; and
    a cooling assembly having a second frame, a tank mounted to said second frame, and a second lifting mechanism for lifting said tank.

17. The machine as set forth in claim 16 further including a heating means for preheating the tool.

18. The machine as set forth in claim 16 further including a carriage assembly for rotatably supporting the tool.

19. The machine as set forth in claim 18 further including a stationary track and said carriage assembly moves along said stationary track.

20. The machine as set forth in claim 16 further including a guard assembly extending about the perimeter of said machine, wherein said guard assembly includes at least one wall having an opening.

21. The machine as set forth in claim 16 further including a computerized control means for controlling operation of the machine.

22. The machine as set forth in claim 16 wherein said powder box further includes a skirt and a platform that is detachably mounted to said first frame.

* * * * *

UNITED STATES PATENT AND TRADEMARK OFFICE
CERTIFICATE OF CORRECTION

PATENT NO. : 6,981,862 B2  Page 1 of 1
APPLICATION NO. : 10/658966
DATED : January 3, 2006
INVENTOR(S) : Janine Bond It is certified that error appears in the above-identified patent and that said Letters Patent is hereby corrected as shown below:

Title page, item [75] inventors, delete "Juhan Kim"

Signed and Sealed this

Eighteenth Day of November, 2008

JON W. DUDAS
*Director of the United States Patent and Trademark Office*